US008037873B2

(12) United States Patent
Bression

(10) Patent No.: US 8,037,873 B2
(45) Date of Patent: Oct. 18, 2011

(54) RESIDUAL BURNT GAS SCAVENGING METHOD WITH DOUBLE INTAKE VALVE LIFT IN A DIRECT-INJECTION SUPERCHARGED INTERNAL-COMBUSION ENGINE, NOTABLY OF DIESEL TYPE

(75) Inventor: Guillaume Bression, Vincennes (FR)

(73) Assignee: IFP, Cedex (FR)

( * ) Notice: Subject to any disclaimer, the term of this patent is extended or adjusted under 35 U.S.C. 154(b) by 443 days.

(21) Appl. No.: 12/361,050

(22) Filed: Jan. 28, 2009

(65) Prior Publication Data
US 2009/0194080 A1 Aug. 6, 2009

(30) Foreign Application Priority Data

Jan. 28, 2008 (FR) ...................................... 08 00485

(51) Int. Cl.
F02M 25/07 (2006.01)
F02B 47/08 (2006.01)
F01L 1/34 (2006.01)
(52) U.S. Cl. .................. 123/568.14; 123/316; 123/90.15
(58) Field of Classification Search ..... 123/90.15–90.18, 123/315, 316, 432, 568.11, 568.14; 701/101–103, 701/108; 60/605.2
See application file for complete search history.

(56) References Cited

U.S. PATENT DOCUMENTS

| 5,819,693 | A  | * | 10/1998 | Curtil ........................... 123/65 E |
| 7,318,314 | B2 | * | 1/2008  | Pagot et al. .................... 123/316 |
| 7,730,874 | B2 | * | 6/2010  | Leduc et al. ................... 123/432 |
| 7,908,913 | B2 | * | 3/2011  | Cinpinski et al. ........... 73/114.79 |
| 2006/0272623 | A1 | | 12/2006 | Pagot |

FOREIGN PATENT DOCUMENTS

FR     2 886 342      12/2006

* cited by examiner

Primary Examiner — Willis Wolfe, Jr.
(74) Attorney, Agent, or Firm — Antonelli, Terry, Stout & Kraus, LLP.

(57) ABSTRACT

The present invention relates to a method of scavenging residual burnt gas of a direct-injection internal-combustion engine, notably of diesel type, comprising at least one cylinder (10) including a combustion chamber (12), at least one exhaust means (14) with an exhaust valve (18) controlled by exhaust control means (42), at least one intake means (24) with an intake valve (28) controlled by intake control means (40) and a processing unit (44) receiving the values relative to the intake pressure (Pa) and to the exhaust pressure (Pe) of the engine. The method consists, when the engine runs under low speed and high load conditions, in carrying out a sequence of opening/closing of exhaust valves (18) during the exhaust phase of the engine, during this exhaust valve opening/closing sequence, in carrying out at least one sequence of opening/closing of intake valves (28) so as to achieve scavenging of the residual burnt gas.

7 Claims, 1 Drawing Sheet

RESIDUAL BURNT GAS SCAVENGING METHOD WITH DOUBLE INTAKE VALVE LIFT IN A DIRECT-INJECTION SUPERCHARGED INTERNAL-COMBUSION ENGINE, NOTABLY OF DIESEL TYPE

FIELD OF THE INVENTION

The present invention relates to a method of scavenging residual burnt gas of a direct-injection supercharged internal-combustion engine, notably of diesel type.

BACKGROUND OF THE INVENTION

Generally, the power delivered by an internal-combustion engine depends on the amount of air fed into the combustion chamber, this amount of air being itself proportional to the density of this air.

As it is well known, if high power is required, an increase in this amount of air is provided by compression of the air before it is fed into this combustion chamber. This operation, referred to as supercharging, can be carried out using any means such as a turbocompressor or a driven compressor such as a screw compressor.

Furthermore, in order to increase even further this amount of air in the cylinder, the residual burnt gas initially contained in the dead volume of the combustion chamber is discharged before the end of the engine exhaust phase and it is replaced by supercharged air. This stage is commonly referred to as burnt gas scavenging.

As described in document FR-A-2,886,342, this scavenging can consist in carrying out, at the end of the engine exhaust phase and at the start of the intake phase, overlapping of the exhaust and intake valves of a cylinder. This overlap is obtained by opening simultaneously these exhaust and intake valves for some degrees to some ten degrees of crank rotation angle.

The intake air is thus fed into the combustion chamber before the end of the exhaust phase by expelling the exhaust gas contained therein. This gas is thus discharged through the exhaust valve and replaced by intake air.

Although this type of engine gives satisfaction, it however involves drawbacks that are by no means insignificant.

In fact, such scavenging requires recesses of great depth in the piston, which consequently degrades the shape of the combustion chamber and the progress of the fuel mixture combustion. Furthermore, this type of engine concurrently requires modifying the opening angles of the exhaust valves and the closing angles of the intake valves.

The present invention aims to overcome the aforementioned drawbacks by means of a scavenging method of simple design allowing to improve the limit fuel/air ratio of the fuel mixture and to increase supercharging and filling of the combustion chamber without degrading the shape thereof. Furthermore, particle emissions are limited and the engine power is increased.

SUMMARY OF THE INVENTION

The present invention therefore relates to a method of scavenging residual burnt gas of a direct-injection internal-combustion engine, notably of diesel type, comprising at least one cylinder including a combustion chamber, at least one exhaust means with an exhaust valve controlled by exhaust control means, at least one intake means with an intake valve controlled by intake control means and a processing unit receiving the values relative to the intake pressure and to the exhaust pressure of the engine, characterized in that it consists, when the engine runs under low speed and high load conditions, in:

carrying out a sequence of opening/closing of the exhaust valve during the exhaust phase of the engine, during this exhaust valve opening/closing sequence, in carrying out at least one sequence of opening/closing of the intake valve so as to achieve scavenging of the residual burnt gas.

The method can consist in starting the intake valve opening/closing sequence when the intake pressure is higher than the exhaust pressure.

The method can consist in performing closing of the intake valve at least before the end of the exhaust phase.

The method can consist in performing closing of the intake valve at the end of the exhaust phase.

The method can consist in performing at least one intake valve opening/closing sequence in a zone of the exhaust phase where the pressure differential between the intake pressure and the exhaust pressure is the highest.

The method can consist in decreasing the height of the intake valve lift during the exhaust phase so that it is lower than the height of the exhaust valve lift.

The method can consist in decreasing the intake valve lift spread during the exhaust phase so that it is lower than the exhaust valve lift spread.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
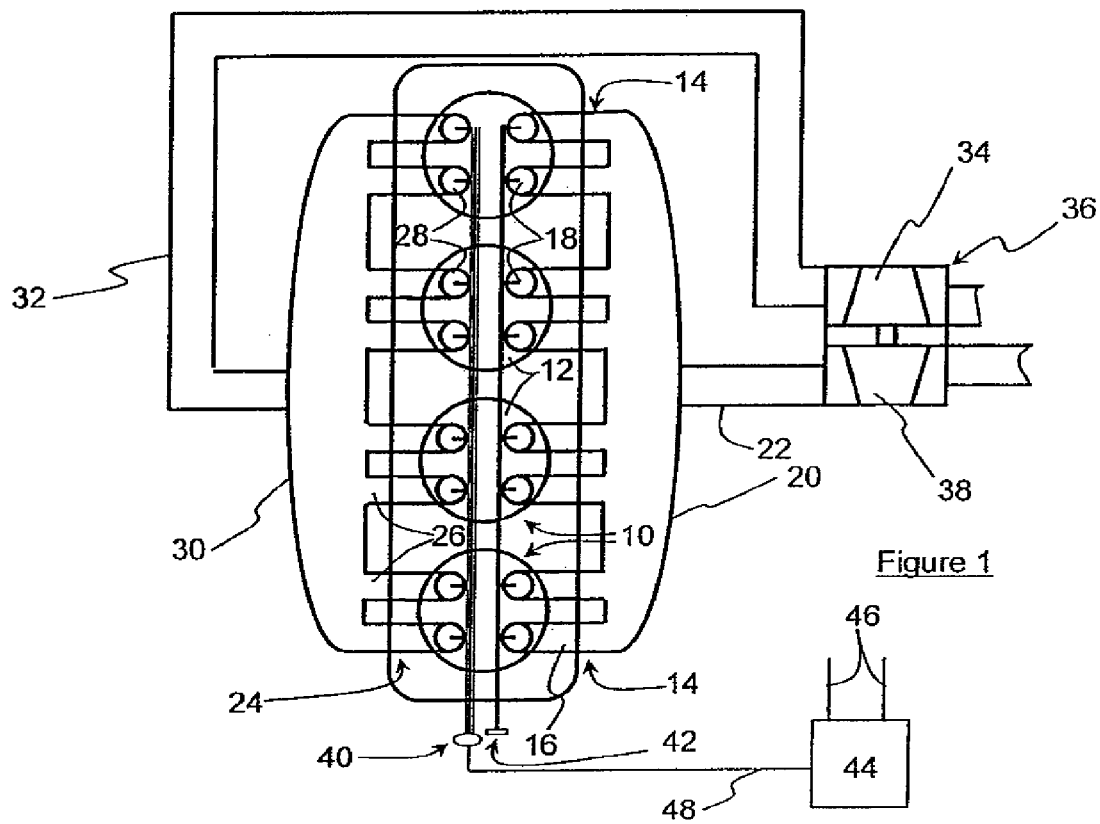
FIG. 1 shows an internal-combustion supercharged engine using the method according to the invention.

In FIG. 1, the internal-combustion engine illustrated is a supercharged internal-combustion engine of self-ignition type, notably a diesel engine, working in four-stroke mode with an intake phase A, a compression phase C, an expansion phase D and an exhaust phase E.

This engine comprises at least one cylinder 10, four cylinders here, in which a piston (not shown) slides in a rectilinear reciprocating motion between a top dead centre (PMH in the figure) and a bottom dead centre (PMB) and delimits a combustion chamber 12 in which combustion of a fuel mixture takes place.

As it is widely known, this fuel mixture can be either a mixture of supercharged air mixed with recirculated exhaust gas (or EGR) with a fuel, or a mixture of supercharged air with a fuel.

The cylinder comprises at least one burnt gas exhaust means 14, two here, including an exhaust pipe 16 associated with a shutoff means such as an exhaust valve 18.

Exhaust pipes 16 end in an exhaust manifold 20 allowing the burnt gas from the combustion chambers to be discharged, this manifold being connected to an exhaust line 22.

This cylinder also comprises at least one intake means 24, two here, including an intake pipe 26 controlled by a shutoff means such as an intake valve 28.

Usually, an intake manifold 30 is connected to intake pipes 26 and it allows fresh air (generally supercharged, mixed or not with recirculated exhaust gas) to be distributed in combustion chambers 12, this manifold being also connected to a supply line 32.

The intake manifold is connected by line 32 to the outlet of compression section 34 of a turbocompressor 36, whereas exhaust manifold 20 is connected by line 22 to the inlet of turbine 38 of this turbocompressor.

Opening and closing of intake valves 28 is controlled by any known means allowing to achieve a double lift of these valves during running conditions requiring high engine power, notably at low engine speeds, or a single lift under conventional engine running conditions at medium and high engine speeds.

Control means 40 of VVA (Variable Valve Actuation) camshaft type allowing the two lift laws of these valves to be achieved are therefore used. A first law allows to perform at least one sequence of opening/closing of intake valves 28 during the exhaust phase E of the engine, followed by a conventional sequence of opening/closing of these valves during the intake phase A. The other lift law allows to perform only a sequence of opening/closing of the intake valves during the intake phase A of the engine.

By way of non limitative example, this camshaft comprises a cam associated with a second cam allowing to provide the double lift law for these intake valves during the exhaust phase E and the intake phase A of the engine, as well as a disengaging device making one of the cams, the second cam for example, inoperative, to achieve the single lift of the intake valves during the engine intake phase.

Of course, without departing from the scope of the invention, these control means can be specific control means for each valve, such as an electromagnetic, electropneumatic actuator or other, directly acting on the valve rod.

It can be noted that the term "lift" corresponds to the graphical representation (along two axes) of the motion of a valve from the moment it starts opening the orifice of the pipe to the orifice full open position to the moment it ends closing this orifice.

Opening and closing of exhaust valves 18 is controlled by any known means such as a conventional camshaft 42 whose rotation is controlled by a driving means connected to the crankshaft of this engine, such as a toothed belt.

This engine also comprises a processing unit 44 referred to as engine calculator that contains mappings or data charts allowing, according to the values of the engine parameters transmitted by data lines 46₄, such as the intake pressures in intake manifold 30 and the exhaust pressures in exhaust manifold 20, the engine speed or the load, to evaluate the power to be generated by this engine to meet the driver's request.

More precisely, this engine calculator allows, according to these values, to control more particularly the lift laws of intake valves 28 through a control line 48 acting upon means 40 so as to allow a single or a double lift of these valves.

Thus, when the engine has to run under conditions corresponding to a high power request, in particular for low engine speeds, the engine calculator controls this engine so that it works with scavenging of the residual burnt gas present in the combustion chamber when the pressure Pa recorded in the intake manifold is higher than the pressure Pe prevailing in the exhaust manifold.

Figure 2:
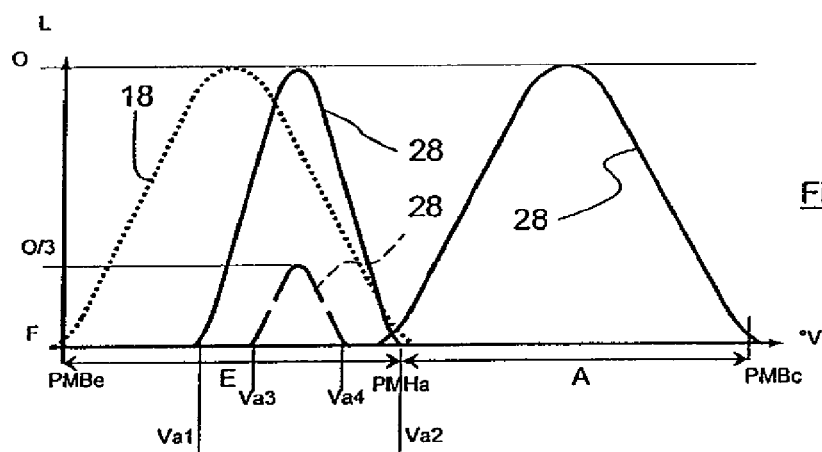
FIG. 2 shows curves illustrating the various lift laws (L) of the intake and exhaust valves as a function of the crank rotation (in crank degrees ° V) of the engine using the method according to the invention.
Figure 3:
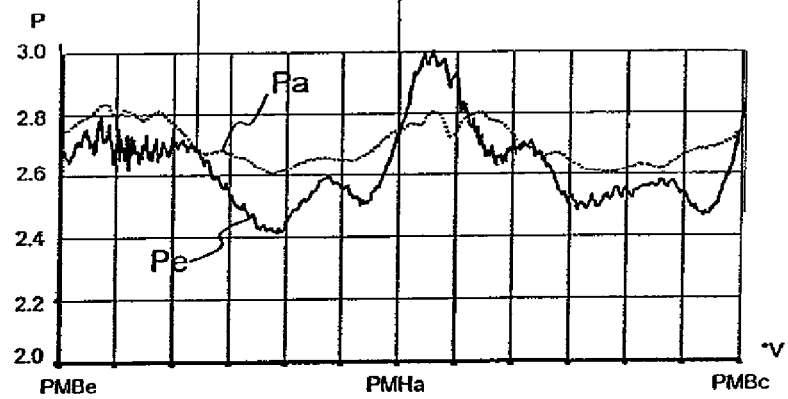
FIG. 3 is a graph with curves illustrating the pressure (P in bar) at the intake (Pa) and at the exhaust (Pe) of a cylinder in the burnt gas scavenging phase as a function of the crank rotation (in degrees).

In connection with FIG. 2 showing the various lift laws for the intake 28 and exhaust 18 valves between an open (O) and a closed (F) position as a function of the crank rotation angle (° V), associated with FIG. 3 showing these crank rotation angles, calculator 44 controls more particularly control means 40 through line 48 to achieve a double lift of intake valves 28 in order to meet the power requirement.

More precisely, as better illustrated in FIG. 2, during the exhaust phase E of the engine, exhaust valves 18 conventionally follow an opening/closing sequence between the exhaust bottom dead centre (PMBe) and the intake top dead centre (PMHa) of the piston so as to discharge the exhaust gas contained in the combustion chamber towards exhaust manifold 20.

Together with this exhaust valve opening/closing sequence, control means 40 are controlled by the engine calculator so as to achieve at least one sequence of opening/closing of intake valves 28 during this exhaust phase and during the exhaust valve opening/closing sequence. This sequence is more particularly carried out when the calculator receives information according to which the pressure Pa considered at the level of intake valves 28 is higher than the pressure Pe recorded at the level of exhaust valves 18.

More particularly, these intake valves open at the exhaust bottom dead centre PMBe or after this PMBe and they close at the intake top dead centre PMHa. Considering the pressure differential between intake pressure Pa and exhaust pressure Pe (see FIG. 3), which is globally positive for the intake pressure, the exhaust gas contained in combustion chamber 12 is discharged through exhaust valves 18 towards exhaust manifold 20 prior to being sent to exhaust line 22. This exhaust gas is thus replaced by supercharged air that allows to globally increase the amount of air present in the combustion chamber at the end of the intake phase A of the engine.

Preferably, as illustrated in thick line in FIG. 2, spreading of the lift of intake valves 28 can be lower than that of exhaust valves 18. These intake valves thus open at a crank angle Va1 after PMBe and they close at an angle Va2 in the vicinity of PMHa. The lift of the intake valves between angles Va1 and Va2 corresponds to a zone of the exhaust phase wherein the pressure differential between intake pressure Pa and exhaust pressure Pe is globally the highest (see FIG. 3) for the exhaust phase considered while being positive for the intake pressure.

Advantageously, the lift height of the intake valves is substantially equal to the lift height of the exhaust valves but, as illustrated in dotted line in FIG. 2, the lift height of these intake valves may be varied, for example between a full open position O and a one-third open position O/3, so as to be able to control discharge of the residual burnt gas.

Similarly, the spread of the intake valves lift can be variable so as to start the opening/closing sequence at angle Va3 after angle Va1 and to end it at angle Va4 before angle Va2.

Preferably, the maximum lift and the maximum spread of these intake valves during the exhaust phase are lower than those of the exhaust valves.

During the intake phase A of this engine that follows this exhaust phase, calculator 44 controls means 40 controlling these intake valves 28 so that they open again conventionally in the vicinity of PMHa and close in the vicinity of compression bottom dead centre PMBc.

Thus, during this second lift of the intake valves, supercharged air adds further to the supercharged air already present in combustion chamber 12 after the scavenging operation so as to obtain a larger amount of air at the end of the intake phase A.

Under conventional engine running conditions without burnt gas scavenging, engine calculator 44 then controls, through line 48, control means 40 so as not to achieve, during exhaust phase E, a lift of intake valves 28 by making inoperative the second cam of the camshaft as mentioned above, which allows these intake valves to be maintained in a closed position. During this exhaust phase, only exhaust valves 18 conventionally follow an opening/closing sequence between PMBe and PMHa.

This exhaust phase is followed by an intake phase A during which intake valves 28 follow a conventional opening/closing sequence between PMHa and PMBc.

The invention therefore readily allows to change from engine running conditions with possibility of scavenging parameters adjustment (amount of burnt gas discharged, time of burnt gas discharge, etc.) by acting on the lift law of the intake valves during the exhaust phase to conventional engine running conditions, and vice versa. Furthermore, the modularity of the intake law allows to control scavenging of the residual burnt gas according to the pressure difference between the intake pressure and the exhaust pressure.

The present invention is not limited to the example described and it encompasses any variant or equivalent.

The invention claimed is:

1. A method of scavenging residual burnt gas of a direct-injection internal-combustion engine, notably of diesel type, comprising at least one cylinder including a combustion chamber, at least one exhaust means with an exhaust valve controlled by exhaust control means, at least one intake means with an intake valve controlled by intake control means and a processing unit receiving the values relative to the intake pressure and to the exhaust pressure of the engine, comprising, when the engine runs under low speed and high load conditions,:
carrying out a sequence of opening/closing of exhaust valve during the exhaust phase of the engine, during this exhaust valve opening/closing sequence, in carrying out at least one sequence of opening/closing of the intake valve so as to achieve scavenging of the residual burnt gas.

2. A method of scavenging the residual burnt gas of an engine as claimed in claim 1, further comprising starting the opening/closing sequence of the intake valve when intake pressure is higher than exhaust pressure.

3. A method of scavenging the residual burnt gas of an engine as claimed in any one of claims 1 or 2, further comprising performing closing of the intake valve at least before the end of the exhaust phase.

4. A method of scavenging the residual burnt gas of an engine as claimed in any one of claims 1 or 2, further comprising performing closing of the intake valve at the end of the exhaust phase.

5. A method of scavenging the residual burnt gas of an engine as claimed in any one of claims 1 or 2, further comprising performing at least one opening/closing sequence of the intake valve in a zone of the exhaust phase where the pressure differential between the intake pressure and exhaust pressure is the highest.

6. A method of scavenging the residual burnt gas of an engine as claimed in any one of the claims 1 or 2, further comprising decreasing the height of the lift of the intake valve during the exhaust phase so that it is lower than the height of the exhaust valve lift.

7. A method of scavenging the residual burnt gas of an engine as claimed in any one of the claims 1 or 2, further comprising decreasing the spread of the lift of the intake valve during the exhaust phase so that it is lower than the spread of the exhaust valve lift.

* * * * *